US012611903B2

(12) United States Patent
Song

(10) Patent No.: US 12,611,903 B2
(45) Date of Patent: Apr. 28, 2026

(54) SUSPENSION DEVICES

(71) Applicant: HYUNDAI MOBIS CO., LTD., Seoul (KR)

(72) Inventor: Woo Bin Song, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 0 days.

(21) Appl. No.: 19/221,453

(22) Filed: May 28, 2025

(65) Prior Publication Data

US 2026/0027862 A1 Jan. 29, 2026

(30) Foreign Application Priority Data

Jul. 29, 2024 (KR) ........................ 10-2024-0100409

(51) Int. Cl.
B60G 7/04 (2006.01)
B60G 7/00 (2006.01)
B60G 7/02 (2006.01)
B62D 21/11 (2006.01)

(52) U.S. Cl.
CPC ............... B60G 7/04 (2013.01); B60G 7/001 (2013.01); B60G 7/02 (2013.01); B62D 21/11 (2013.01); *B60G 2204/143* (2013.01); *B60G 2204/4102* (2013.01)

(58) Field of Classification Search
CPC . B60G 7/04; B60G 7/001; B60G 7/02; B60G 2204/143; B60G 2204/4102; B62D 21/11
See application file for complete search history.

(56) References Cited

U.S. PATENT DOCUMENTS

| | | | | |
|---|---|---|---|---|
| 4,955,634 A * | 9/1990 | Smith | .................. | B60G 7/02 |
| | | | | 280/124.136 |
| 5,374,075 A * | 12/1994 | Lee | .................. | B60G 3/06 |
| | | | | 280/5.521 |
| 6,352,272 B1 * | 3/2002 | Lee | .................. | B60G 7/02 |
| | | | | 280/124.125 |
| 2014/0131971 A1 * | 5/2014 | Hou | .................. | B60G 3/26 |
| | | | | 280/124.128 |

FOREIGN PATENT DOCUMENTS

KR 10-2024-0002483 A 1/2024

* cited by examiner

*Primary Examiner* — Jason D Shanske
*Assistant Examiner* — Matthew James O'Neill
(74) *Attorney, Agent, or Firm* — NSIP Law

(57) ABSTRACT

A suspension device includes a lower arm connected to a wheel carrier to be rotatable up and down according to movement of the wheel carrier, a frame part connected to the lower arm to receive the movement of the wheel carrier, and a restraint part disposed on the frame part to restrain a rotation range of the lower arm.

11 Claims, 14 Drawing Sheets

200

210

220

300

310

320

330

SUSPENSION DEVICES

CROSS-REFERENCE TO RELATED APPLICATION

This application claims the benefit under 35 U.S.C. § 119(a) of priority to Korean Patent Application No. 10-2024-0100409 filed on Jul. 29, 2024, in the Korean Intellectual Property Office, the entire disclosure of which is incorporated herein by reference for all purposes.

BACKGROUND

1. Field

Exemplary embodiments of the present disclosure relate to suspension devices, and more particularly, to suspension devices installed to improve ride comfort by absorbing vibration or impact generated between an axle and a road surface while a vehicle is driving.

2. Description of the Related Art

In general, a suspension device of a vehicle is a device that is connected to the axle to control vibration or shock from a road surface while the vehicle is driving so that the vibration or shock is not directly transmitted to the vehicle body and improves ride comfort. The suspension device includes coil springs, shock absorbers that control the free vibration of the coil springs, and stabilizer bars that suppress the rolling phenomenon of the vehicle.

The conventional shock absorbers are installed between a vehicle body and a wheel to absorb natural vibrations caused by the shock received by the coil spring while the vehicle is driving. The shock absorbers may have different structures of connection parts depending on the locations of the shock absorbers mounted on the vehicle body and movement characteristics.

However, many parts such as washers and bushes are required to mount the shock absorbers. A rubber bush of the shock absorber may continuously contract and expand. In this case, the rubber bush may be torn or worn due to continuous repetitive movement.

The background technology of the present disclosure is disclosed in Korean Patent Publication No. 10-2024-0002483 (published on Mar. 11, 2024, entitled "REAR SHOCK ABSORBER FOR VEHICLE").

SUMMARY

Various embodiments of the present disclosure are directed to a suspension device capable of reducing the weight of a vehicle and securing space between internal vehicle parts by eliminating a shock absorber.

In an embodiment of the present disclosure, a suspension device includes a lower arm connected to a wheel carrier and configured to be rotatable up and down according to movement of the wheel carrier, a frame part connected to the lower arm and configured to receive the movement of the wheel carrier, and a restraint part disposed on the frame part and configured to restrain a rotation range of the lower arm.

The lower arm may include a first fixing hole disposed opposite the wheel carrier, the frame part may include a second fixing hole disposed to face the first fixing hole, and the suspension device may further include a fixing member passing through the first fixing hole and the second fixing hole and serving as a rotational center axis of the lower arm.

The frame part may include a guide hole disposed opposite the wheel carrier with respect to the second fixing hole and configured to guide the movement of the restraint part on the frame part.

The restraint part may include a shaft part inserted into the guide hole, a step part connected to the shaft part and disposed to protrude outward with a larger diameter than the guide hole to prevent the shaft part from moving, and a guide fasten part connected to the step part and configured to restrain the movement of the shaft part.

The lower arm may include a restraint hole having a same diameter as the shaft part.

The restraint part may be fitted into the restraint hole without being spaced apart, so that the lower arm may be fixed without moving in the longitudinal direction of the lower arm.

The guide hole may have a curved surface that is in vertical contact with the shaft part.

The guide hole may have a surface that contacts the shaft part on the left and right sides and has a same curvature based on the rotation center axis of the lower arm.

The guide hole may have a vertically elongated shape and restrain the range in which the lower arm connected to the wheel carrier rises or falls when the wheel carrier rotates up or down.

The shaft part may include an insulator disposed between the lower arm and the frame part not to move in the longitudinal direction of the shaft part.

The insulator may include a material having lower hardness than the lower arm and the frame part to alleviate friction occurring at a contact surface with the lower arm when the lower arm rotates up or down.

3

Figure 12A:
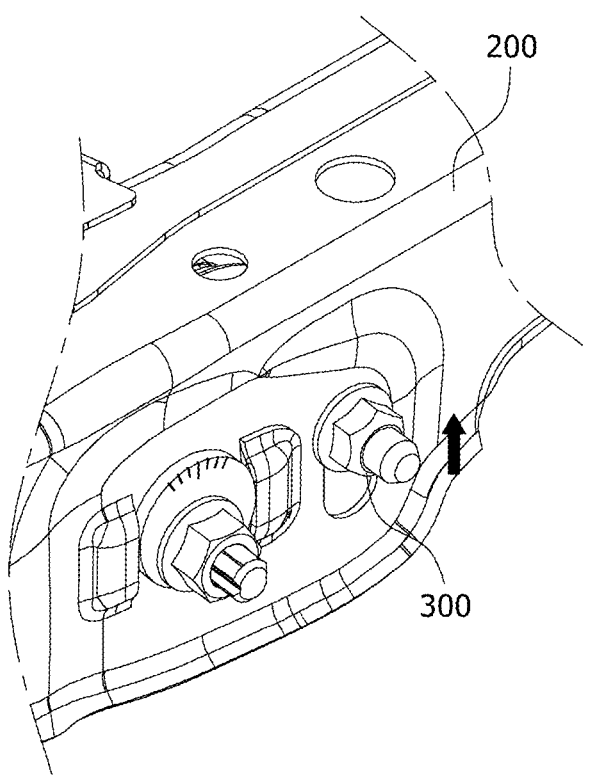

FIG. 12A schematically illustrates a rebound state of a suspension device according to an embodiment of the present disclosure.

Figure 12B:
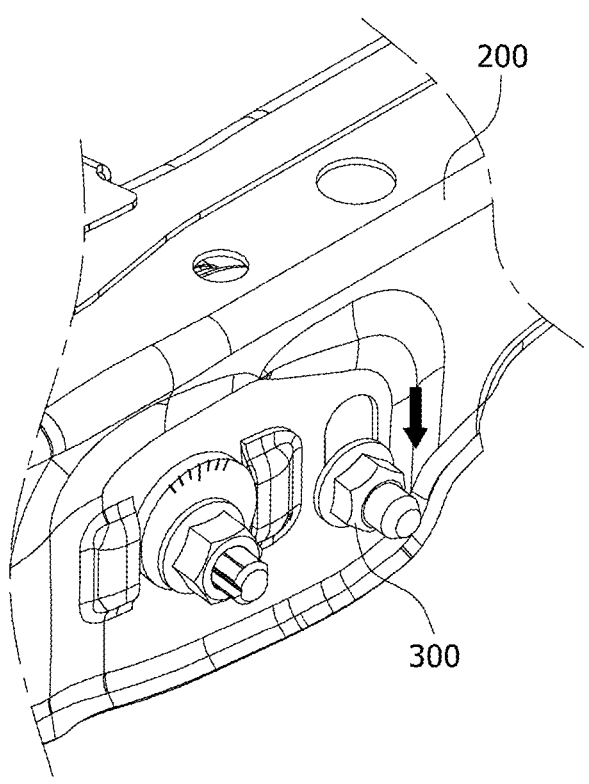

FIG. 12B schematically illustrates a bump state of a suspension device according to an embodiment of the present disclosure.

Figure 13:
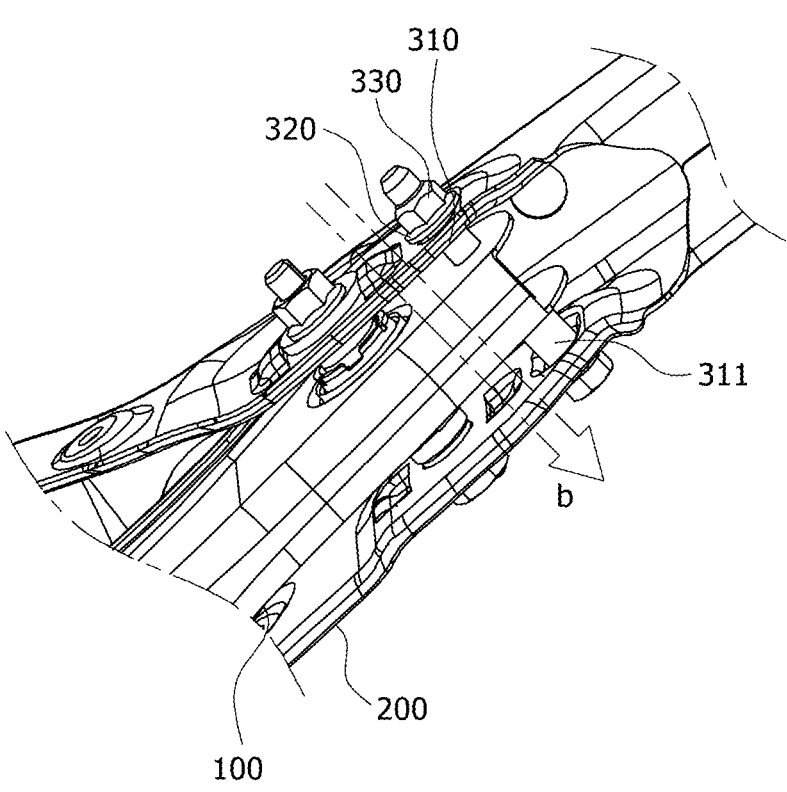

FIG. 13 schematically illustrates an insulator of a suspension device according to an embodiment of the present disclosure.

DETAILED DESCRIPTION

Hereinafter, an embodiment of a suspension device according to the present disclosure will be described in detail below with reference to the accompanying drawings through various exemplary embodiments. It should be considered that the thickness of each line or the size of each component in the drawings may be exaggeratedly illustrated for clarity and convenience of description.

In such a process, the thickness of a line or the size of an element illustrated in the drawings may have been exaggerated for the clarity of a description and for convenience' sake. Terms to be described below have been defined by taking into consideration their functions in the present disclosure, and may be different depending on a user or operator's intention or practice. Accordingly, such terms should be interpreted based on the overall contents of this specification.

In addition, in this specification, when a part is "connected (or connected)" to another part, it includes not only "directly connected (or connected) to another part, but also "indirectly connected (or connected) to" another member in between. In this specification, when a part "includes (or has) a component, this means that other components may be further "included (or has)" rather than excluding other components unless specifically stated to the contrary.

The object and effect of the present disclosure may be naturally understood or made clearer by the following description, and the object and effect of the present disclosure are not limited only by the following description. In addition, in describing the present disclosure, if it is determined that the description of the known technology related to the present disclosure may unnecessarily obscure the gist of the present disclosure, the detailed description thereof will be omitted.

Figure 1:
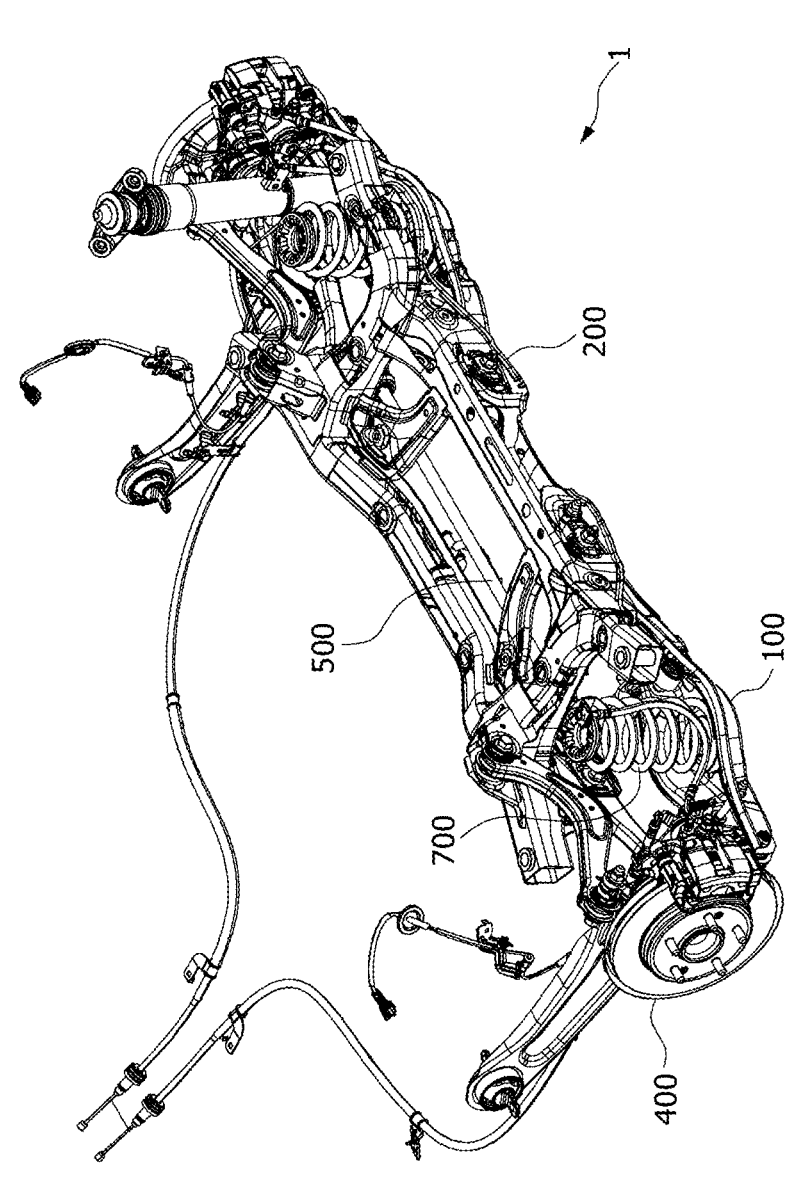
FIG. 1 is a perspective view schematically illustrating a suspension device according to an embodiment of the present disclosure.
Figure 2:
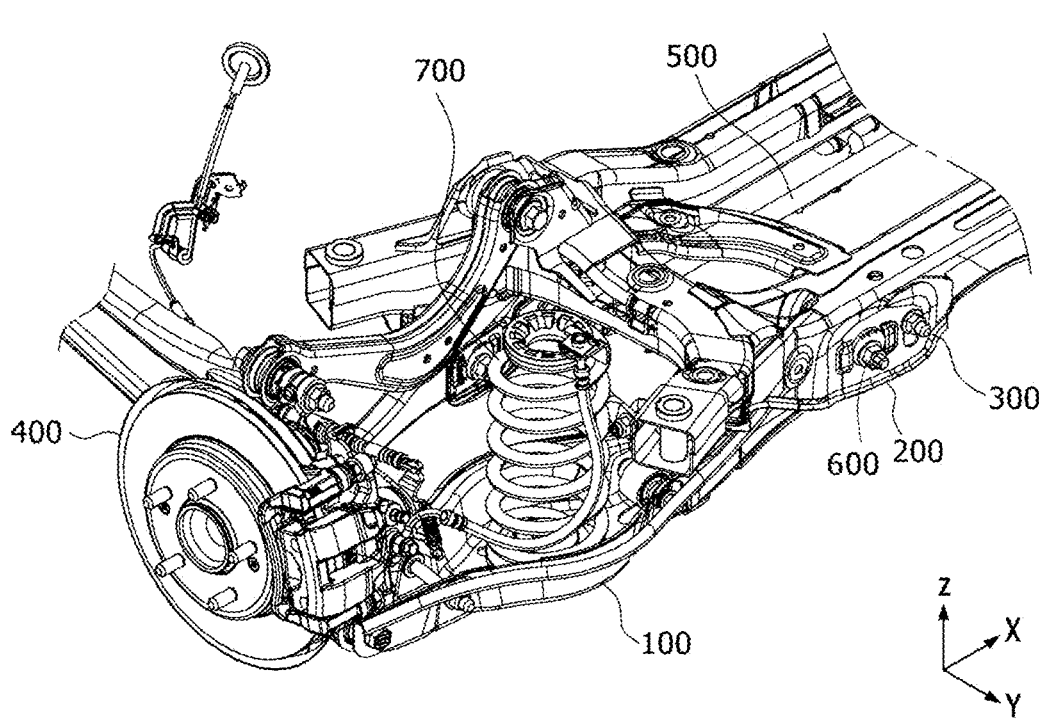
FIG. 2 schematically illustrates a suspension device according to an embodiment of the present disclosure.
Figure 3:
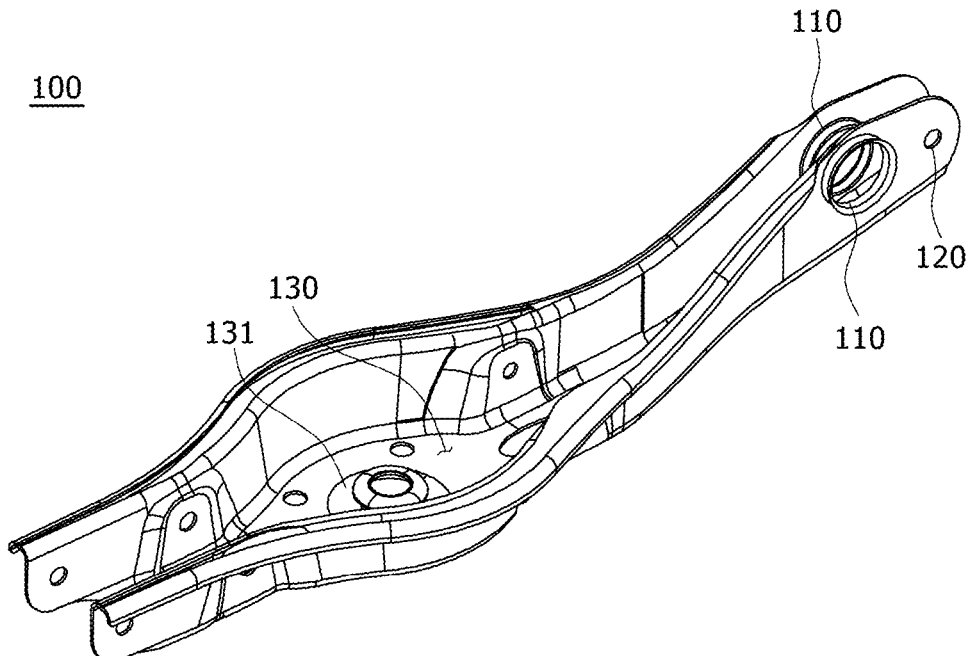
FIG. 3 schematically illustrates a lower arm of a suspension device according to an embodiment of the present disclosure.

FIG. 1 is a perspective view schematically illustrating a suspension device 1 according to an embodiment of the present disclosure. FIG. 2 schematically illustrates the suspension device 1 according to an embodiment of the present disclosure. FIG. 3 schematically illustrates a lower arm 100 of the suspension device 1 according to an embodiment of the present disclosure.

Referring to FIG. 1, the suspension device 1 according to an embodiment of the present disclosure includes the lower arm 100, a frame part 200, and a restraint part 300.

The lower arm 100 is connected to a wheel carrier 400 to be rotatable up and down according to the movement of the wheel carrier 400.

The suspension device 1 is a device that is connected between an axle and a vehicle body frame and absorbs vibrations or shocks transmitted from a road surface during driving, thereby improving the ride comfort and stability of the vehicle. The suspension device 1 includes the wheel carrier 400 that rotatably supports a wheel, and the lower arm 100 and an upper arm (not shown) that are disposed in a width direction of the vehicle and connected to the wheel carrier 400 to enable the vehicle body to rotate.

The suspension device 1 according to an embodiment of the present disclosure includes the lower arm 100 disposed on one side and an elastic member 700 that supports the vehicle body and is disposed on the other side.

Referring to FIG. 1, the elastic member 700 that supports the vehicle body is mounted on the lower arm 100. Because the elastic member 700 supports bending caused by irregularly repeated up-and-down movements, twisting caused by centrifugal force when turning, and the load of the vehicle, durability and rigidity are required for the lower arm 100.

In this embodiment, the elastic member 700 is described as an example of an elastically deformable coil spring, but the present disclosure is not limited thereto and various modifications are possible.

Referring to FIG. 2, the coil spring is disposed so that one end is connected to the vehicle body and the other end is connected to the lower arm 100 to absorb the shocks transmitted from the road surface.

Referring to FIG. 3, the lower arm 100 is provided with an elastic member mounting portion 130 so that the spring is mounted, and a mounting projection 131 is provided on an edge of the elastic member mounting portion 130 so that the spring is mounted on the lower arm 100 without being detached. The lower arm 100 may be manufactured by aluminum forging or aluminum extrusion to reduce weight.

The lower arm 100 is connected to a stabilizer bar link so that the movement of the vehicle when the vehicle turns may be transmitted to a stabilizer bar 500.

When the vehicle body is unbalanced, the stabilizer bar 500 is controlled to reduce the inclination of the vehicle body and restore the posture of the vehicle body to a balanced state. The stabilizer bar 500 is disposed across the left and right directions of the vehicle, both ends of the stabilizer bar 500 are connected to the stabilizer bar link (not shown), and the stabilizer bar link is rotatably coupled to the lower arm 100. Thus, the movement of the lower arm 100 may be transmitted to the stabilizer bar 500 and the frame part 200.

In the drawings below, the X-axis direction represents a direction parallel to a longitudinal direction of the lower arm 100, and the Y-axis direction represents a direction perpendicular to the longitudinal direction of the lower arm 100 and parallel to the longitudinal direction of the restraint member 300. The X-axis direction and the Y-axis direction may be mutually perpendicular directions. The Z-axis direction represents a direction perpendicular to the longitudinal direction of the lower arm 100 and the longitudinal direction of the restraint part 300. In other words, the Z-axis direction may be a direction perpendicular to the X-Y plane.

In addition, in the drawings below, a first horizontal direction, a second horizontal direction, and a vertical direction may be understood as follows. The first horizontal direction may be understood as the X-axis direction, the second horizontal direction may be understood as the Y-axis direction, and the vertical direction may be understood as the Z-axis direction.

Referring to FIGS. 2 and 3, the lower arm 100 includes first fixing holes 110 that are disposed on an opposite side of the wheel carrier 400 and are rotatable according to the movement of the wheel carrier 400. A fixing member 600 described later passes through the first fixing holes 110 so that the lower arm 100 may rotate in the vertical direction (Z-axis direction) with the fixing member 600 as a rotation axis.

The lower arm 100 is provided with a restraint hole 120 having the same diameter as a shaft part 310 described below. Because the restraint hole 120 of the lower arm 100 has the same diameter as the shaft part 310, the movement of the lower arm 100 in the vertical direction (Z-axis direction) may be transmitted to the restraint part 300.

Figure 4:
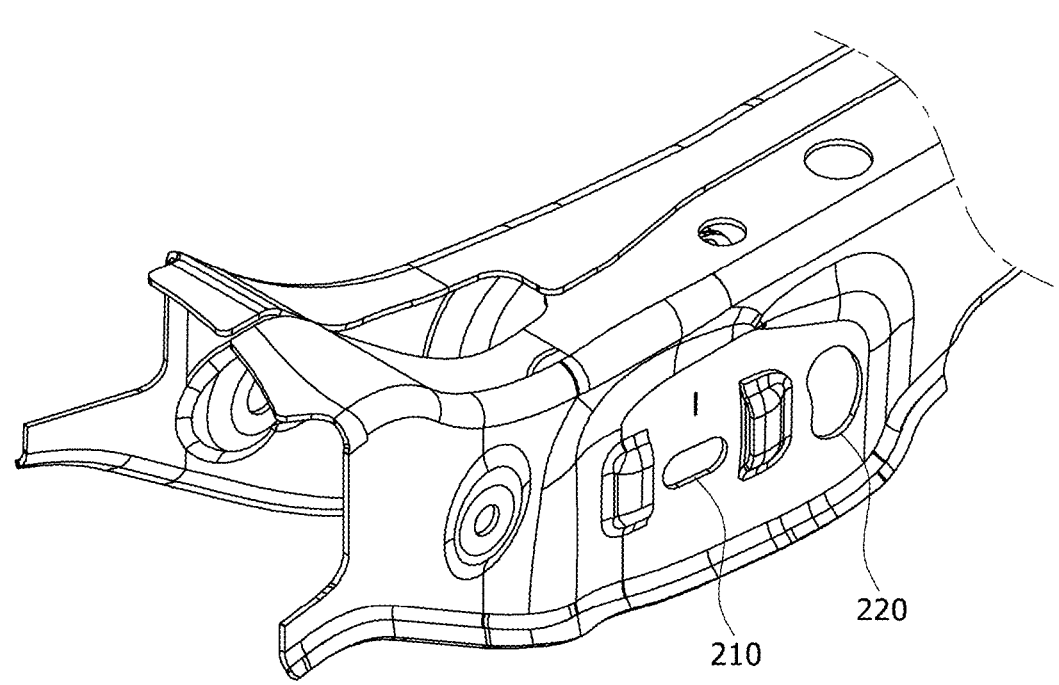
FIG. 4 schematically illustrates a frame part of a suspension device according to an embodiment of the present disclosure.

FIG. 4 schematically illustrates the frame part 200 of the suspension device according to an embodiment of the present disclosure.

Referring to FIGS. 2 and 4, the frame part 200 is rotatably connected to the lower arm 100 so that the movement of the wheel carrier 400 is transmitted.

The frame part 200 is connected to the lower arm 100 so that the movement of the wheel carrier 400 is transmitted.

The frame part 200 includes second fixing holes 210 disposed to face the first fixing holes 110. The second fixing holes 210 are disposed in an oval shape having a long length in the first horizontal direction (X-axis direction). The second fixing holes 210 are provided on both sides of the frame part 200 with reference to FIG. 4.

The second fixing holes 210 are disposed on the same line as the first fixing hole 110. The fixing member 600 passes through the first fixing hole 110 and the second fixing holes 210, so that the lower arm 100 rotates up and down with the fixing member 600 as a rotation axis. The frame part 200 includes guide holes 220 disposed on the opposite side of the wheel carrier 400 with respect to the second fixing holes 210 to guide the movement of the restraint part 300 on the frame part 200. The guide holes 220 are disposed spaced apart from the second fixing holes 210.

The guide holes 220 are provided with a vertical length. The restraint part 300 is fitted into the guide holes 220 and rotated vertically, that is, in the vertical direction (Z-axis direction). Specifically, the guide holes 220 may restrict the movement of the shaft part 310 described below.

Figure 5:
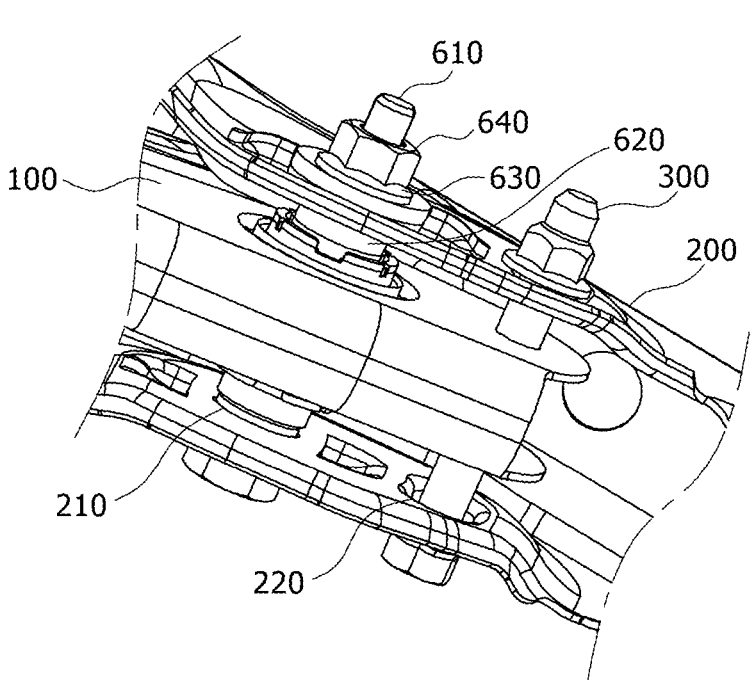
FIG. 5 schematically illustrates a fixing member of a suspension device according to an embodiment of the present disclosure.

FIG. 5 schematically illustrates the fixing member 600 of the suspension device according to an embodiment of the present disclosure.

Referring to FIG. 5, the fixing member 600 passes through the first fixing holes 110 and the second fixing holes 210 and becomes the rotation center axis of the lower arm 100. In this case, the first fixing holes 110, the second fixing holes 210, and the fixing member 600 are disposed on the same line and have the same rotation center axis. Accordingly, the lower arm 100 may rotate around the fixing member 600.

The fixing member 600 includes a fixing shaft 610 and a coupling member 620.

Figure 6:
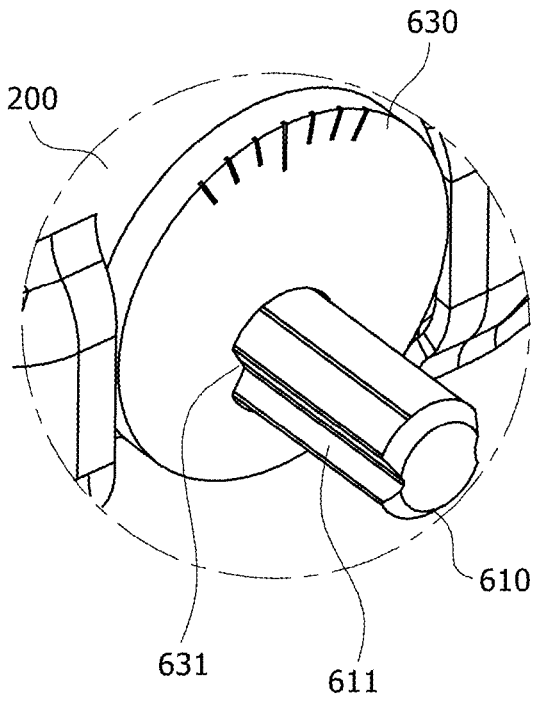
FIG. 6 schematically illustrates a fixing shaft of a suspension device according to an embodiment of the present disclosure.

FIG. 6 schematically illustrates the fixing shaft 610 of the suspension device according to an embodiment of the present disclosure.

Referring to FIG. 6, the fixing shaft 610 refers to a shaft that penetrates the first fixing holes 110 and the second fixing holes 210. In this embodiment, the fixed shaft 610 is described as a cylindrical shaft as an example, but the present disclosure is not limited thereto and various modifications are possible.

The fixing shaft 610 includes a fixing groove 611 that is concavely formed inward. The suspension device 1 according to an embodiment of the present disclosure further includes a cam bolt 630 so that the fixing shaft 610 is coupled without a gap when the fixing shaft 610 penetrates the second fixing holes 210.

The cam bolt 630 may adjust the toe angle and camber angle by changing the fixing position of the lower arm 100 according to the rotation angle. By including the cam bolt 630, the lower arm 100 may rotate about the fixing member 600 as a rotation axis.

A fixing groove projection 631 corresponding to the fixing groove 611 of the fixing shaft 610 is disposed on the cam bolt 630. As the fixing groove projection 631 is inserted into and coupled to the fixing groove 611, it is possible to prevent the fixing shaft 610 from being idled while the fixing shaft 610 is coupled without a gap.

Referring to FIG. 5, by coupling the cam bolt 630 to the fixing shaft 610 and then connecting the fixed bolt 640 to the fixing shaft 610, the coupling with the fixing shaft 610, the first fixing holes 110, and the second fixing holes 210 may be stably supported.

Figure 7:
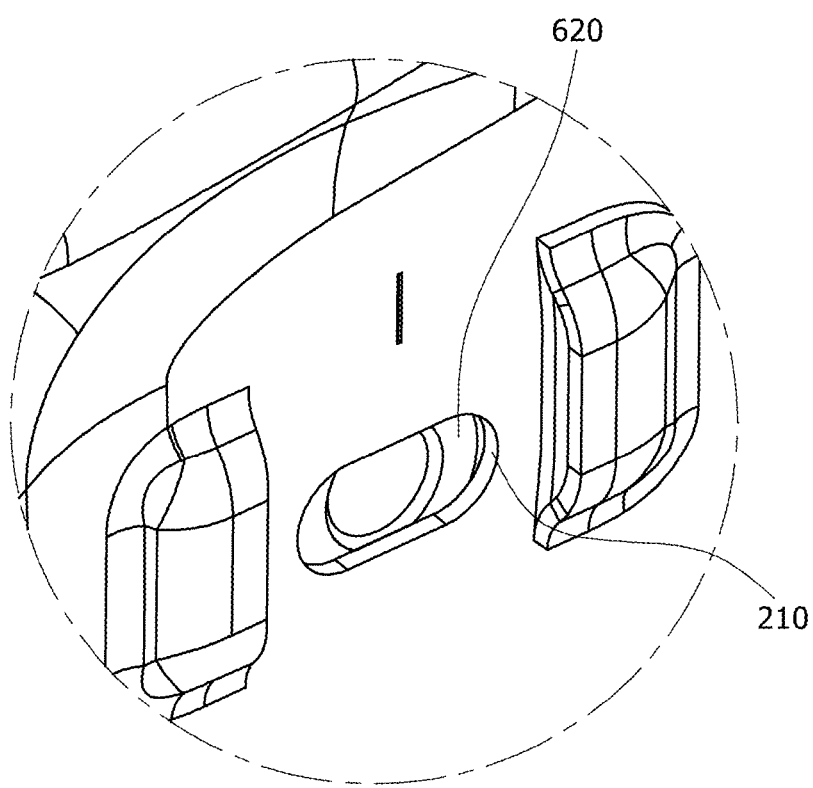
FIG. 7 schematically illustrates a coupling member of a suspension device according to an embodiment of the present disclosure.

FIG. 7 schematically illustrates the coupling member 620 of the suspension device according to an embodiment of the present disclosure.

Referring to FIG. 7, the coupling member 620 is provided to surround the fixing shaft 610 to prevent the fixing shaft 610 from idling. As shown in FIG. 7, the coupling member 620 has a hole through which the fixing shaft 610 passes. That is, the coupling member 620 surrounding the fixing shaft 610 passes through the first fixing holes 110 as one unit with the fixing shaft 610.

Referring to FIGS. 3 and 4, the sizes of the first fixing hole 110 and the second fixing hole 210 may be different. When the diameters of the first fixing hole 110, the second fixing hole 210, and the fixing member 600 are the same, the lower arm 100 cannot freely rotate around the fixing member 600 as a rotation axis. Accordingly, the sizes of the first fixing hole 110 and the second fixing hole 210 are different. To prevent the fixing shaft 610 passing through the first fixed holes 110 and the second fixed holes 210 from idling in the first fixing hole 110 having a larger diameter, the coupling member 620 is provided to surround the fixing shaft 610 when passing through the first fixing holes 110.

Figure 8:
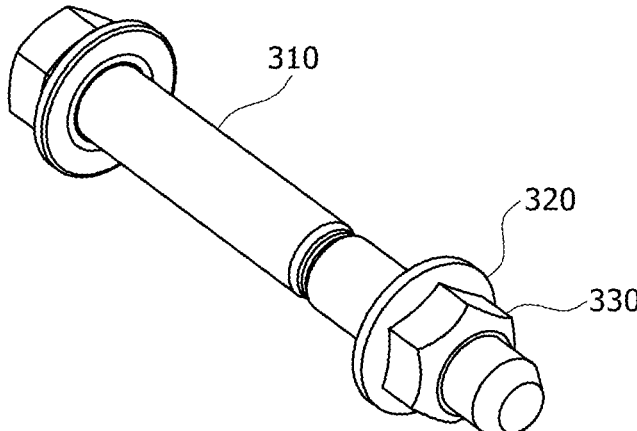
FIG. 8 schematically illustrates a restraint part of a suspension device according to an embodiment of the present disclosure.

FIG. 8 schematically illustrates the restraint part 300 of the suspension device according to an embodiment of the present disclosure.

Referring to FIG. 8, the restraint part 300 includes the shaft part 310, a step part 320, and a guide fastening part 330.

The shaft part 310 is inserted into the guide hole 220. In this embodiment, the shaft part 310 is described as a cylindrical pillar, but the present disclosure is not limited thereto and various modifications are possible.

The step part 320 is connected to the shaft part 310 and protrudes outwardly with a diameter larger than the guide hole 220 to prevent the shaft part 310 from moving. The step part 320 protrudes outwardly to prevent the shaft part 310 from moving in the second horizontal direction (Y-axis direction).

The step part 320 has a larger diameter than the shaft part 310 or the guide hole 220. As a result, the restraint part 300 may be fixed without moving in the second horizontal direction (Y-axis direction) between the lower arm 100 and the frame part 200.

The guide fastening part 330 is connected to the step part 320 and restrains the movement of the shaft part 310. Specifically, the guide fastening part 330 having a thread formed inside is screwed and fastened to the shaft part 310 having a thread formed outside the shaft part 310. The guide fastening part 330 is nut-fastened outside the stepped part 320 to further restrain and fix the movement of the restraint part 300 in the second horizontal direction (Y-axis direction).

As the fixing member 600 passes through the first fixing hole 110 and the second fixing hole 210, the lower arm 100 is rotated up and down while the fixing member 600 is inserted into the lower arm 100 and the frame part 200 and the restraint part 300 passes through the guide hole 220 disposed to be spaced apart from the second fixing hole 210, thereby limiting the vertical rotation range of the lower arm 100.

The frame part 200 is opened downward, and the lower arm 100 is coupled to the open space of the frame part 200. Accordingly, the lower arm 100 rotates while overlapping the frame part 200, thereby increasing space utilization.

Figure 9:
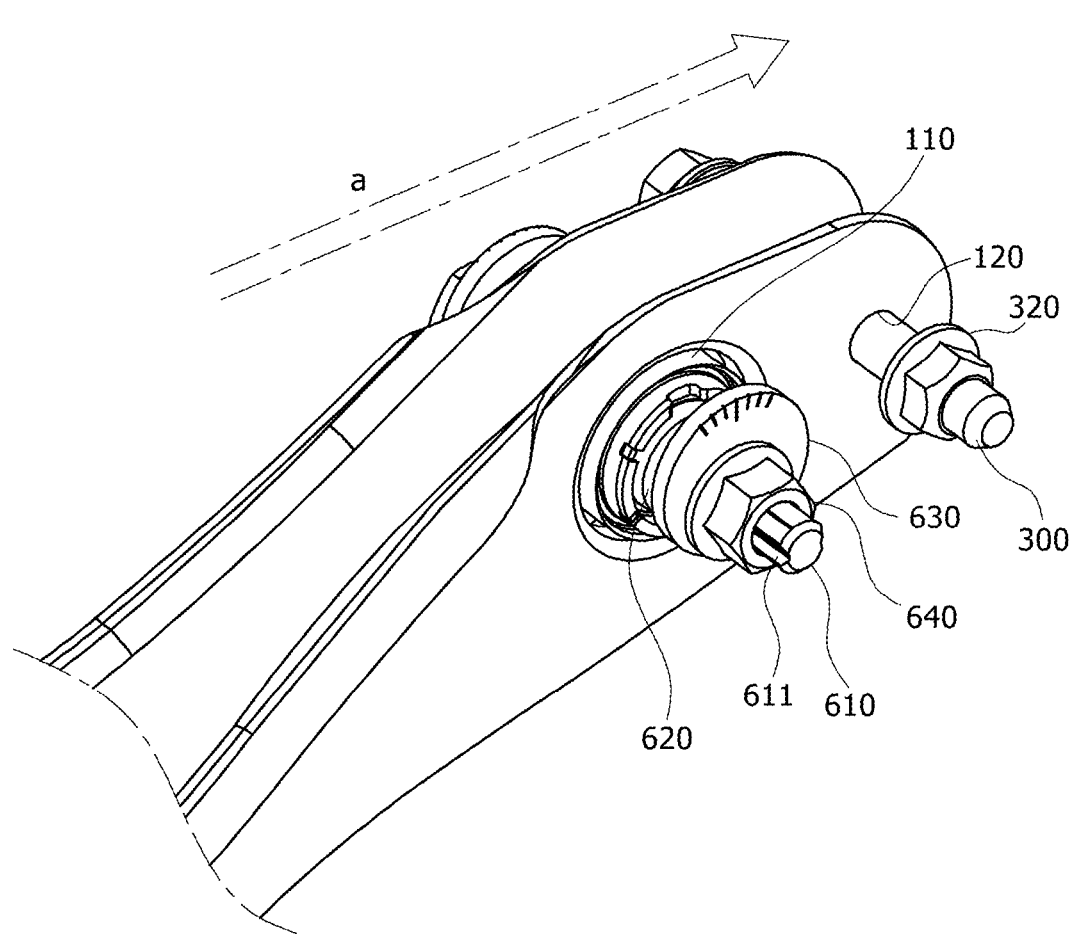
FIG. 9 schematically illustrates coupling of a lower arm and a restraint part of a suspension device according to an embodiment of the present disclosure.

FIG. 9 schematically illustrates coupling of the lower arm 100 and the restraint part 300 of the suspension device according to an embodiment of the present disclosure.

Referring to FIG. 9, the restraint part 300 is fitted into the restraint hole 120 having the same diameter as the shaft part 310 so as not to be spaced apart from each other, and thus, the lower arm 100 may be fixed without moving in the first horizontal direction "a" (X-axis direction), which is the horizontal direction of the lower arm 100. Thus, the direction of the lower arm 100 to rotate in the vertical direction (Z-axis direction) rather than the first horizontal direction (a, X-axis direction).

Figure 10:
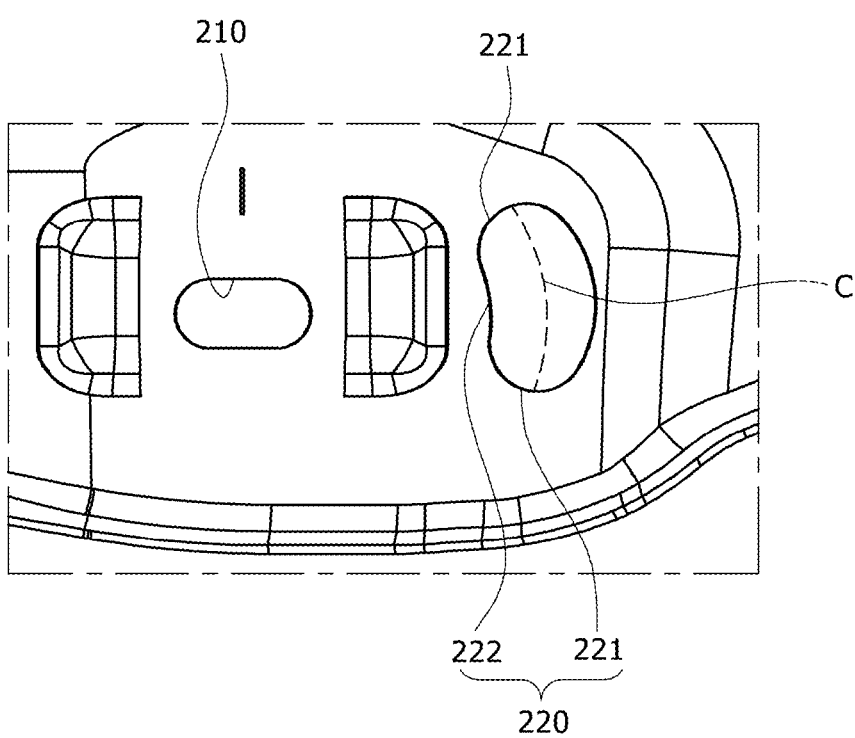
FIG. 10 schematically illustrates a guide hole of a suspension device according to an embodiment of the present disclosure.

FIG. 10 schematically illustrates the guide hole 220 of the suspension device according to an embodiment of the present disclosure.

Referring to FIG. 10, a surface of the guide hole 220 in vertical contact with the shaft part 310 is formed as a curved surface. Hereinafter, the surface of the guide hole 220 in vertical contact with the shaft part 310 is referred to as a first surface 221. The first surface 221 in which the guide hole 220 and the shaft part 310 in vertical contact is formed as a curved surface by forming.

As the first surface 221 is provided as a curved surface, the restraint part 300 may not be damaged when the restraint part 300 reciprocates in the vertical direction (Z-axis direction).

The guide hole 220 is formed with the same curvature based on the rotational center axis of the lower arm 100 on the surface that comes into contact with the shaft part 310 on the left and right. Hereinafter, the surface where the guide hole 220 comes into contact with the shaft part 310 on the left and right is referred to as the second surface 222. The second surface 222 is formed as a curved surface along path c of the rotating lower arm 100.

Referring to FIG. 10, because the lower arm 100 rotates vertically (Z-axis direction) with respect to the fixing member 600 passing through the second fixing hole 210, the lower arm 100 reciprocates in a curve in the guide hole 220 spaced apart from the second fixing hole 210. As the second surface 222 is formed as a curved surface, the rotating lower arm 100 may reciprocate more easily.

Figure 11:
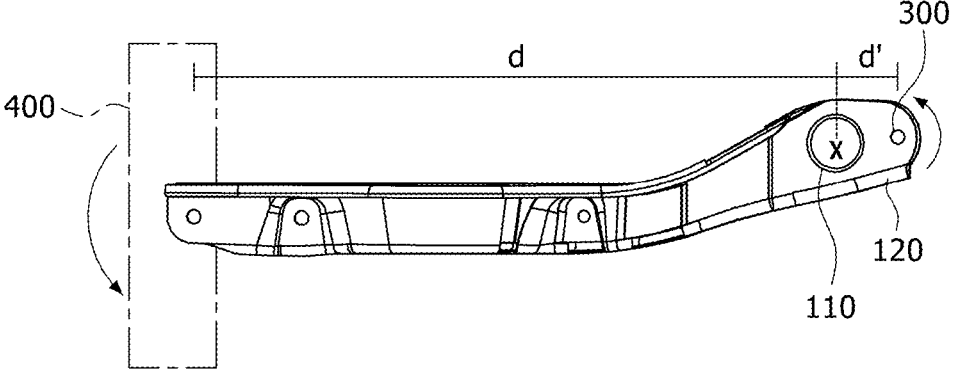
FIG. 11 schematically illustrates a rotation state of a lower arm of a suspension device according to an embodiment of the present disclosure.

FIG. 11 schematically illustrates a rotation state of the lower arm 100 of the suspension device according to an embodiment of the present disclosure.

Referring to FIG. 11, the distance "d" from the first fixing hole 110 to the wheel carrier 400 is longer than the distance "d" to the restraint hole 120, so the vertical movement of the wheel carrier 400 may be easily transferred from the restraint hole 120 to the restraint part 300 moving.

In addition, when the wheel carrier 400 rotates clockwise, because the restraint hole 120 also rotates clockwise, the restraint part 300 rotates counterclockwise, that is, downward.

As shown in FIG. 10, when the wheel carrier 400 rotates counterclockwise, because the restraint hole 120 also rotates counterclockwise, the restraint member 300 rotates clockwise, that is, upward. As a result, the restraint part 300 may restrain the rotation radius of the lower arm 100.

When the vehicle drives on a bumpy road, the vehicle body vibrates and the wheel also vibrates up and down. In this case, when the wheel rises, it is called a bump state, and when the wheel is lowered, it is called a rebound state.

FIG. 12A schematically illustrates a rebound state of the suspension device according to an embodiment of the present disclosure.

Referring to FIG. 12A, when the wheel is lowered (counterclockwise) and the wheel carrier 400 rotates downward, the position of the restraint hole 120 on the opposite side of the wheel carrier 400 of the lower arm 100 rises. The guide hole 220 may restrain the range in which the lower arm 100 connected to the wheel carrier 400 rises when the wheel carrier 400 rotates downward.

FIG. 12B schematically illustrates a bump state of the suspension device according to an embodiment of the present disclosure.

Referring to FIG. 12B, when the wheel rises upward (clockwise) and the wheel carrier 400 rotates upward, the position of the restraint hole 120 on the opposite side of the wheel carrier 400 of the lower arm 100 is lowered. The guide hole 220 is provided in a vertically elongated shape, and may restrain the range in which the lower arm 100 connected to the wheel carrier 400 is lowered when the wheel carrier 400 rotates upward.

Accordingly, the lower arm 100 is installed between the wheel carrier 400 and the vehicle body and the range of rising or falling of the lower arm 100 is restrained, thereby alleviating the shock applied to the driver and improving ride comfort and driving stability.

FIG. 13 schematically illustrates an insulator 311 of the suspension device according to an embodiment of the present disclosure.

Referring to FIG. 13, the shaft part 310 includes the insulator 311 that is positioned between the lower arm 100 and the frame part 200 and prevents the shaft part 310 from moving in the longitudinal direction. That is, the shaft part 310 includes the insulator 311 to prevent the shaft part 310 from moving in the second horizontal direction "b".

The insulator 311 includes a material having a lower hardness than the lower arm 100 and the frame part 200 to alleviate friction occurring at the contact surface with the lower arm 100 when the lower arm 100 rotates up and down.

The insulator 311 is provided to surround the shaft part 310 and comes into contact with the lower arm 100. In this case, friction occurs on a contact surface when the lower arm 100 rotates up and down, so a material with low hardness may be included to alleviate the friction.

Specifically, the insulator 311 includes an elastically deformable material. Because the insulator 311 includes the elastically deformable material, the lower arm 100 is fixed not to move in the second horizontal direction "b" (Y-axis direction), and the friction generated when the lower arm 100 and the frame part 200 come into contact with the insulator 311 may be minimized.

In this embodiment, the insulator 311 is described as an example of a rubber material, but the present disclosure is not limited thereto and various modifications are possible.

Therefore, the following effects may be obtained in the suspension device according to an embodiment of the present disclosure.

The suspension device according to the present disclosure can secure the distance and space between the parts arranged inside the suspension device by deleting a shock absorber.

The suspension device according to the present disclosure can reduce the weight of the vehicle by eliminating the shock absorber.

The suspension device according to the present disclosure can reduce the manufacturing cost of the shock absorber by eliminating the shock absorber.

The suspension device according to the present disclosure can reduce the vehicle height by eliminating the shock absorber, and can improve the ride quality.

The suspension device according to the present disclosure can simplify and reduce the manufacturing process by eliminating components such as rubber bushes used in the shock absorber.

The suspension device according to the present disclosure can reduce the manufacturing cost by eliminating components such as rubber bushes used in the shock absorber.

The suspension device according to the present disclosure can limit the amount of bumps and rebounds by adding a guide hole structure to the frame, which is an existing part.

Although exemplary embodiments of the disclosure have been disclosed for illustrative purposes, those skilled in the art will appreciate that various modifications, additions and substitutions are possible, without departing from the scope and spirit of the disclosure as defined in the accompanying claims. Thus, the true technical scope of the disclosure should be defined by the following claims.

What is claimed is:

1. A suspension device comprising:
    a lower arm connected to a wheel carrier and configured to be rotatable up and down according to movement of the wheel carrier, the lower arm comprising a first fixing hole disposed opposite the wheel carrier;
    a frame part connected to the lower arm and configured to receive the movement of the wheel carrier, the frame part comprising a second fixing hole disposed to face the first fixing hole;
    a restraint part disposed on the frame part and configured to restrain a rotation range of the lower arm; and
    a fixing member including a fixing shaft passing through the first fixing hole and the second fixing hole and serving as a rotational center axis of the lower arm, the fixing shaft including a fixing groove that is concavely formed inward.

2. The suspension device of claim 1,
    wherein the fixing member includes a coupling member surrounding the fixing shaft to prevent the fixing shaft from idling.

3. The suspension device of claim 2, wherein the frame part comprises a guide hole disposed opposite the wheel carrier with respect to the second fixing hole and configured to guide movement of the restraint part on the frame part.

4. The suspension device of claim 3, wherein the restraint part comprises:
    a shaft part inserted into the guide hole; and
    a step part connected to the shaft part and disposed to protrude outward with a larger diameter than the guide hole to prevent the shaft part from moving.

5. The suspension device of claim 4, wherein the lower arm comprises a restraint hole having a same diameter as the shaft part.

6. The suspension device of claim 4, wherein the guide hole has a curved surface in vertical contact with the shaft part.

7. The suspension device of claim 4, wherein the guide hole has a surface that contacts with the shaft part on left and right sides and has a same curvature based on the rotation center axis of the lower arm.

8. The suspension device of claim 4, wherein the guide hole has a vertically elongated shape and restrains a range in which the lower arm connected to the wheel carrier rises or falls when the wheel carrier rotates up or down.

9. The suspension device of claim 8, wherein the shaft part comprises an insulator disposed between the lower arm and the frame part.

10. The suspension device of claim 9, wherein the insulator comprises a material having lower hardness than the lower arm and the frame part to alleviate friction occurring at a contact surface with the lower arm when the lower arm rotates up or down.

11. The suspension device of claim 1, wherein the lower arm includes an elastic member mounting portion configured to accommodate an elastic member that supports a vehicle body and a mounting projection disposed on an edge of the elastic member mounting portion to which the elastic member is attached.

*   *   *   *   *